Jan. 24, 1967 E. A. THOMPSON 3,299,680
ROLLING MACHINE FOR FORMING TUBULAR WORKPIECES
Original Filed Nov. 25, 1960 9 Sheets-Sheet 1

INVENTOR.
EARL A. THOMPSON
BY
Ralph L. Tweedale
ATTORNEY

Jan. 24, 1967    E. A. THOMPSON    3,299,680
ROLLING MACHINE FOR FORMING TUBULAR WORKPIECES
Original Filed Nov. 25, 1960    9 Sheets-Sheet 2

INVENTOR.
EARL A. THOMPSON
BY
Ralph L. Tweedale
ATTORNEY

United States Patent Office 3,299,680
Patented Jan. 24, 1967

3,299,680
ROLLING MACHINE FOR FORMING
TUBULAR WORKPIECES
Earl A. Thompson, 1300 Hilton Road,
Bloomfield Hills, Mich. 48220
Continuation of application Ser. No. 71,758, Nov. 25,
1960. This application June 10, 1965, Ser. No. 467,811
3 Claims. (Cl. 72—6)

This application is a continuation of application Serial No. 71,758, filed November 25, 1960.

This invention relates to apparatus for forming a tubular work piece. The invention is useful in the manufacture of articles such as valve tappets and hydraulic valve lifters commonly used in internal combustion engines and wherein a tubular body or skirt is required to have one or more cannelures in its wall.

The present invention is concerned particularly with the manufacture of a valve tappet of the hydraulic type and especially by a method which is more economical than methods currently being used.

A valve tappet usually includes an outer tubular body member and an inner tubular plunger member, which members are so designed and assembled as to trap hydraulic fluid therebetween and thus form an operative connection between the cam of the engine and the push rod. Heretofore, various methods have been employed for the manufacture of such tappets. Usually, the body and plunger of the tappet are formed from castings or solid bar stock. This requires extensive machining and grinding operations.

It has been proposed to form such tappets from tubular blanks having wall thicknesses sufficient to enable machining these members to their proper shape and dimensions. The tubular blanks are cut from seamless tubing or welded tubing; and since these members in the finished form usually have end caps welded thereto, the steel employed is of a low carbon content; namely, S.A.E. 1010 or 1020. With such steels it is difficult to produce a smooth finish by conventional machining operations; and thus expensive grinding operations must be resorted to obtain the desired finish. In addition, seamless steel tubing is not usually concentric to within a few thousands of an inch; and, therefore, excessive material must be removed by grinding. Grinding, and especially internal grinding, is an expensive operation, not only from the standpoint of time consumed but also from the standpoint of capital investment. In the case of welded tubing, problems arise in connection with removing the weld flash from both the inside and the outside of the tube.

The present invention contemplates a method for making formed tubular parts such as valve tappets wherein very little machining is required, and wherein the amount of grinding that is necessary is reduced to an absolute minimum.

More specifically, the invention contemplates a machine for making tappet bodies, plungers, and similar parts wherein the necessary configuration of the side wall of the work piece is produced by a rolling operation rather than by a machining operation. Thus, closer tolerances can be obtained than is the case with machining, and the necessity for leaving sufficient clean-up stock to remove tool marks inevitable with machining is eliminated. At the same time the rolling operation is performed in a manner and by such apparatus that the necessity for producing a smooth finish on some surface by grinding is entirely eliminated and the grinding of other surfaces is reduced to a minimum.

A further object of the invention resides in the provision of a novel apparatus for forming such valve tappet bodies economically and at a high rate of production.

Another object of the present invention is to provide a novel apparatus for rolling valve tappet bodies in which automatic transfer of blanks and finished work pieces is provided with a minimum of idle time.

Another object of the present invention is to provide an improved apparatus for radially compacting the walls of a tubular work piece and to an improved product thereof.

Another object is to provide an improved arrangement for imparting coordinated motions hydraulically to the various moving parts of an automatic rolling machine.

A further object is to provide an automatic rolling machine having means for feeding blanks to the machine automatically and for automatically ejecting finished work pieces.

Further objects and advantages of the present invention will be apparent from the following description, reference being had to the accompanying drawings wherein a preferred form of the present invention is illustrated.

In the drawings:

FIGURE 18 is a fragmentary front view of the machine partly in section on line 18—18 of FIGURE 12.

FIGURE 19 is a sectional view on line 19—19 of FIGURE 12.

FIGURE 28 is an enlarged view corresponding to a portion of FIGURE 25.

FIGURE 29 is a view corresponding to FIGURE 21 showing a modified work piece configuration.

Figure 1:
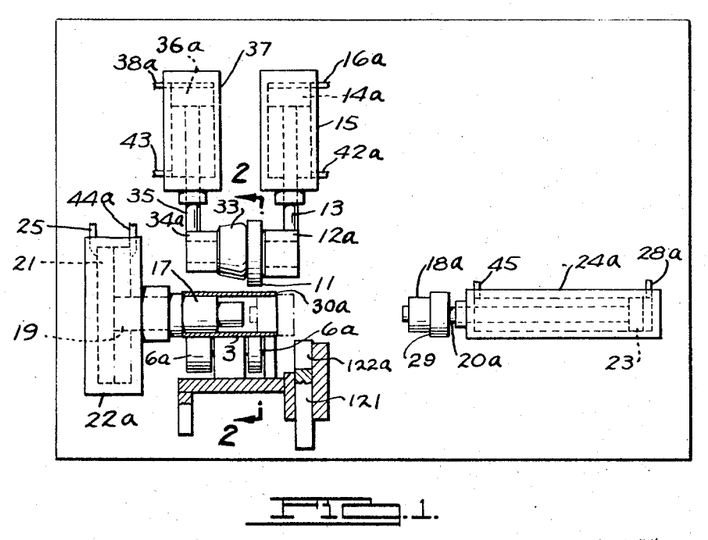
FIGURE 1 is a top plan view, partly in section, of an apparatus for making one form of tubular tappet body.
Figure 2:
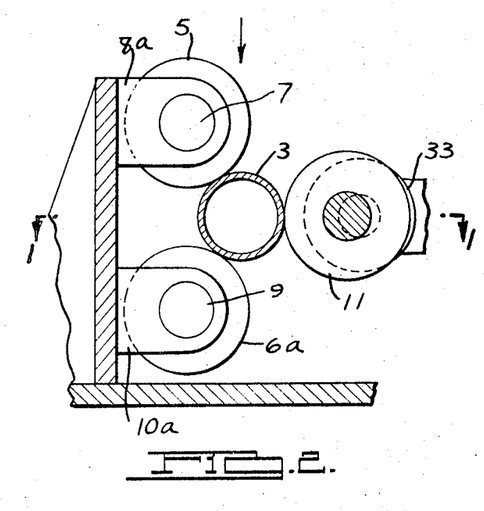
FIGURE 2 is a vertical section of the apparatus taken along line 2—2 of FIGURE 1.
Figure 2B:
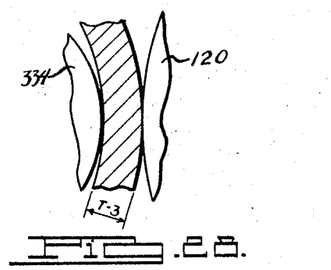
Figure 2S:
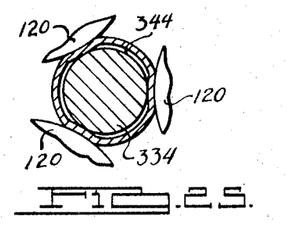
Figure 3:
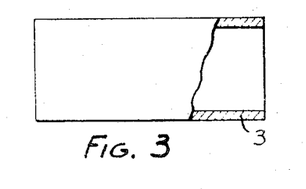
FIGURE 3 is an elevation, partly in section, of a tubular body blank before rolling.
Figure 4:
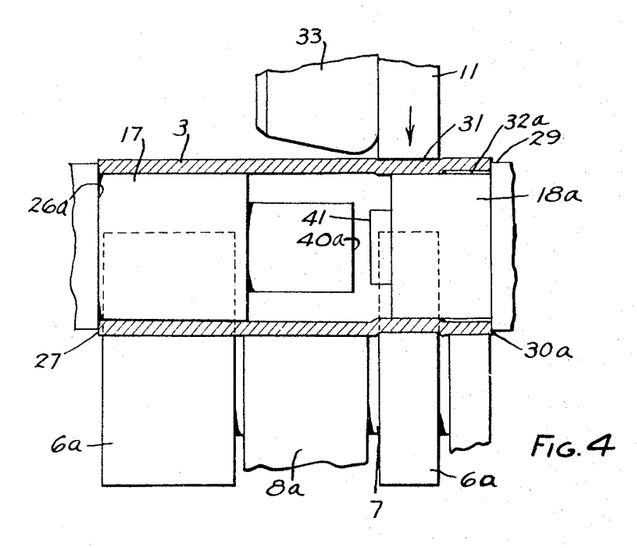
FIGURE 4 is a fragmentary plan view of the apparatus showing the first operation of rolling a portion of the tubular blank to reduce its diameter.
Figure 5:
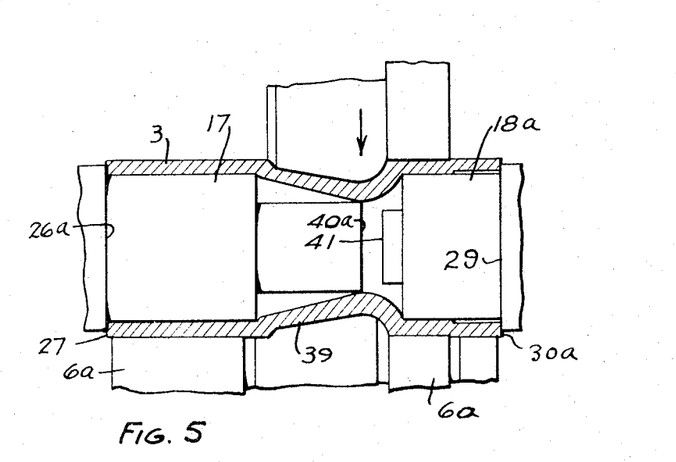
FIGURE 5 is a fragmentary view of the apparatus showing the second step of rolling a shoulder in the tubular blank preparatory to the succeeding step of longitudinally upsetting the reduced portion of the tube.
Figure 6:
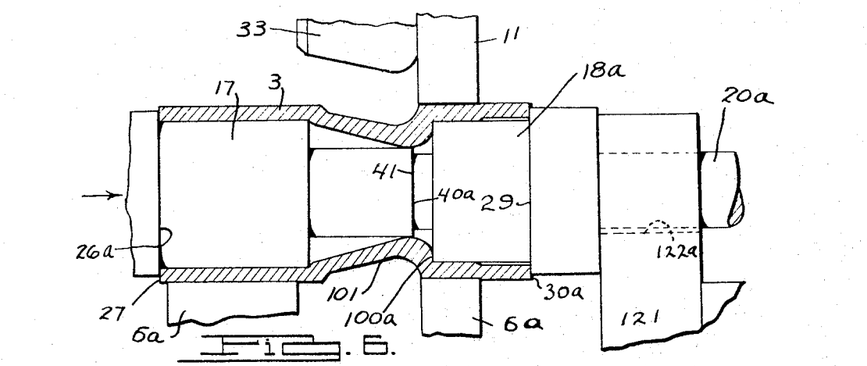
FIGURE 6 is a fragmentary view of the apparatus showing they tube after it has been upset longitudinally to form an internal shoulder therein.

Referring more particularly to the drawings, there is shown in FIGURE 6 a tubular work piece 3 which may form the hollow body or skirt of a mechanical automotive valve tappet and which has been made according to the method illustrated in FIGURES 1–6 of the drawings. This tappet body 3 starts out as a straight cylindrical piece of low carbon steel or other ductile tubing such as illustrated in FIGURE 3. The blank is preferably welded low carbon steel tubing, but, if desired, can be seamless tubing.

Blank 3 is placed upon opposed rollers 5 and 6a, FIGURE 2. Roller 5 comprises a pair of rollers which are driven from an auxiliary source of power and are mounted on a common shaft 7 and journaled in the stationary support 8a. Roller 6a comprises a pair of rollers driven by an auxiliary source and mounted on a common shaft 9 and journaled in a stationary support 10a. Rollers 5 and 6a are driving rollers. An idling roller 11 is journaled upon support 12a (FIG. 1) carried on piston rod 13, connected to piston 14a within cylinder 15.

Arbors 17 and 18a are arranged to be moved within blank 3, as shown in FIGURE 4. As shown in FIG. 1 arbors 17 and 18a are rotatably mounted upon supporting shafts 19 and 20a, respectively. Shaft 19 is fixed at its outer end to piston 21 within cylinder 22a. Shaft 20a is fixed at its outer end to piston 23 within cylinder 24a. Fluid under pressure admitted into cylinder 22a through line 25 moves arbor 17 to the right until shoulder 26a abuts against end 27 of blank 3a. Fluid under pressure admitted into cylinder 23 through line 28a moves arbor 18a to the left until its circumferential shoulder 29 abuts against the other end 30a of blank 3. Fluid under pressure admitted into cylinder 15 through line 16a causes idler roller 11 to press against and rotate with tube 3 upon rollers 5 and 6a. Thus, roller 11 reduces the diameter of blank 3 throughout the width of roller 11 to form an annular groove 31, as shown in FIGURE 4.

It will be noted that arbor 18a has a diameter slightly less than the internal diameter of blank 3 as indicated by the clearance 32a. Roller 11 has two functions, first, as described above, it is used to size blank 3. Commercial seamless or welded tubing is graded by the tolerances on the outer diameter and inner diameter. The closer the tolerances are held, the more expensive the tubing, thus, by the method outlined above, the cheaper tubing with wide tolerances may be used, and by subjecting it to the above described method, a part may be produced with very close tolerances, thus saving considerably on the cost of the original material. Second, this roller 11 keeps blank 3 from expanding when it is subjected to pressure on each end in the upsetting operation which appears further on in this description.

As shown in FIG. 1, forming roller 33 is journaled upon support 34a carried at the outer end of piston rod 35. The inner end of rod 35 is connected to piston 36a within cylinder 37.

While roller 11 is rotated by blank 3 through rollers 5 and 6a, fluid under pressure may be admitted into forming roller cylinder 37 through inlet 38a, thus causing forming roller 33 to move toward blank 3 and rollers 5 and 6a (leftward in FIGURE 2), thereby rolling a circumferential groove or cannelure 39 in blank 3 as shown in FIGURE 5. Since blank 3 is confined at its ends by shoulders 26a and 29 of arbors 17 and 18a throughout the rolling operation of rollers 33 and 11, and since this confinement prevents elongation of blank 3, therefore section 101, (FIG. 6) which is reduced in diameter, is thickened by the rolling operation.

After the rolling operation illustrated in FIGURE 5, roller 33 is retracted by admitting fluid under pressure into cylinder 37 through line 43, line 38a being open to exhaust at this time. While the arbor 18a remains in position in the right-hand end of the blank 3, a buck 121 is shifted upwardly in FIGURE 1 by manual or other means, not shown. The buck 121 has a bifurcated end 122a which embraces the piston rod 20a to back up the arbor 18a against rightward movement. The parts are shown in this position in FIGURE 6.

Fluid under higher pressure is next admitted through inlet 25 into cylinder 22a thereby moving arbor 17 inwardly or to the right, FIGURE 6, until the end 40a of arbor 17 contacts the end 41 of arbor 18a. As arbor 17 moves to the right or axially of tube 3 from the position shown in FIGURE 5 to that shown in FIGURE 6, shoulder 26a presses against end 27 of blank 3 and this pressure shortens the length of tube 3 and upsets blank 3 to form shoulder 100a. Roller 11 is now retracted by admitting fluid under pressure into cylinder 15 through line 42a, line 16a being open to exhaust at this time. After rollers 11 and 33 have been withdrawn from the blank to the position shown in FIGURE 1, arbors 17 and 18a are next withdrawn by admitting fluid under pressure into their respective cylinders through lines 44a and 45, lines 25 and 28a being open to exhaust at this time. Oil holes may next be drilled or punched in blank 3 and blank 3 may then be ground to size in a centerless grinder and thereby complete a body 3 in the general form shown in FIGURE 6.

Referring now to FIGURES 7 through 29, there is illustrated a machine and product incorporating another form of the present invention. In this form of device the machine is arranged for fully automatic performance of the method of the present invention, taking the blank work pieces from a gravity supply chute and delivering finished work pieces to an output chute.

The machine comprises a base 10 in the form of a rectangular box having a heavy, flat top plate 12 provided with an oil receiving trough 14 around its periphery. The base 10 is provided with internal compartments, one of which, indicated at 16, forms a reservoir for coolant oil received from trough 14 and has a removable clean out cover 18 and a gasket mounted, motor driven, circulating pump 20 bolted on the end wall of the base. Suitable coolant distribution conduits, not shown, may lead from the pump 20 to the vicinity of the work piece later to be described. The base 10 may also be provided with a compartment 22 in which is mounted a pressure tank or accumulator 24 forming a plenary supply of oil under high pressure and forming part of a mechanicohydraulic motivation system for the several parts of the machine, as will be described in detail hereafter.

Mounted on the top plate 12 is a stationary headstock casting 26 which supports a pair of round way bars 28. The opposite ends of the way bars 28 are supported in a bracket 30 which is also secured to the top plate 12. Adjustably fixed on the way bars 28 is a generally triangular working head 32 which is secured in place by suitable tangent clamping screws such as illustrated at 34 in FIGURE 11. Also mounted upon the ways 28 for longitudinal sliding movement is a tailstock, generally designated 36.

Figures 15, 16, 17:
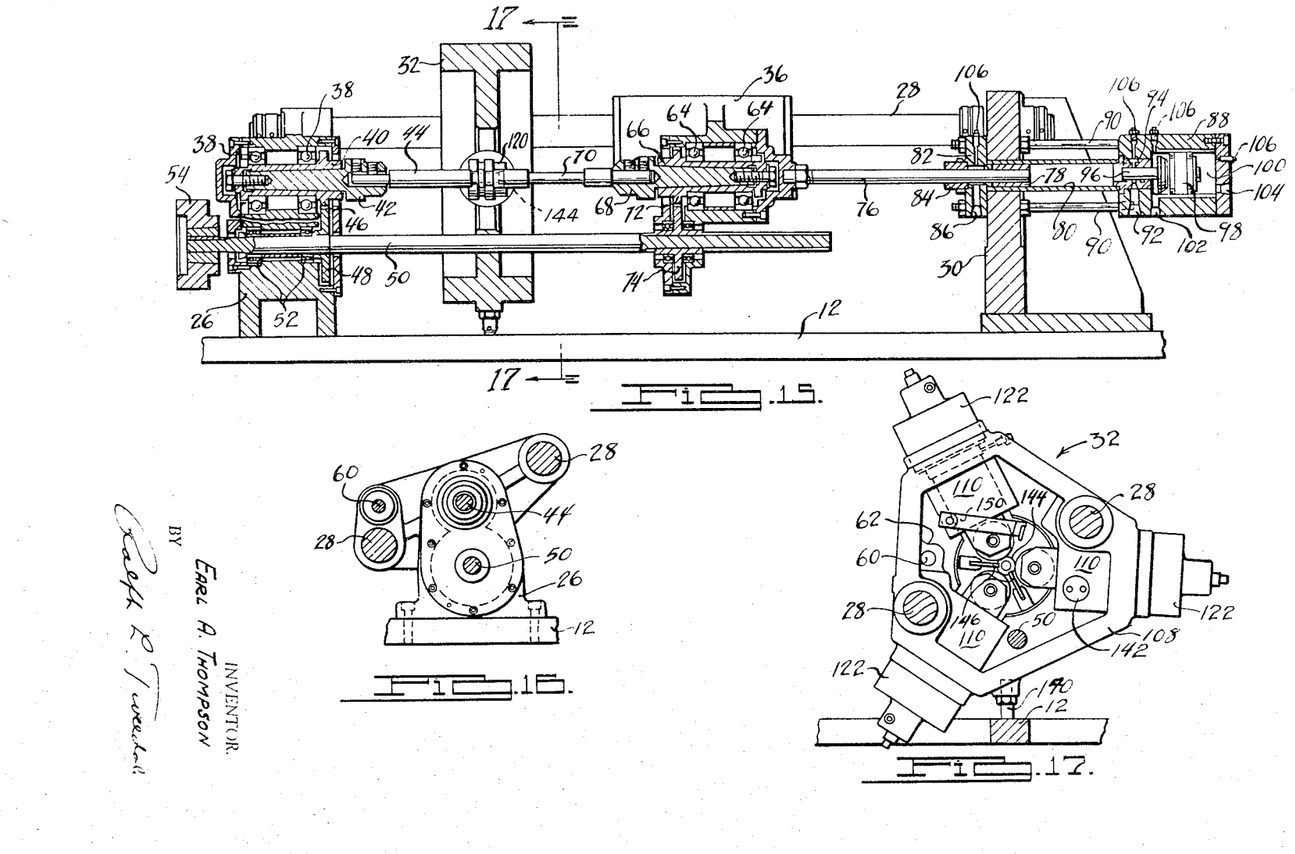
FIGURE 15 is a sectional view on line 15—15 of FIGURE 10.
FIGURE 16 is a sectional view on line 16—16 of FIGURE 9.
FIGURE 17 is a sectional view on line 17—17 of FIGURE 15.

Referring now to FIGURE 15, the headstock 26 carries upon thrust bearings 38 a rotatable spindle 40. The spindle 40 may receive a removable chuck member 42 which in turn holds an arbor member 44. The spindle, chuck, and arbor are arranged to rotate in unison and in a fixed position axially.

The spindle 40 carries a gear 46 which meshes with a driving gear 48 keyed to a quill shaft 50, which also is journaled in the headstock 26 upon bearings 52. The shaft 50 carries a driving pulley 54 at its left-hand end which is connected by a belt 56, FIGURE 9, with an electric motor 58 which may be connected to a suitable electric power line by the usual motor controller, not shown. The headstock 26 also carries a screw adjusting bar 60 for precisely locating the work head 32 along the ways 28. For this purpose the bar 60 is mounted in the headstock for relative rotation in a fixed axial relation to the headstock and is threaded into a boss 62, FIGURE 17, on the work head 32.

The tailstock 36 carries on thrust bearings 64 a spindle 66 having a chuck member 68 and a removable arbor 70. The spindle, chuck, and arbor are arranged for conjoint rotation in a fixed axial relation to the tailstock 36 which slides on the ways 28. The spindle 66 carries a gear 72 which meshes with a driving gear 74 which is is splined to the quill shaft 50.

At its right-hand end in FIGURE 15 the tailstock 36 has secured thereto a piston rod 76 which has at its right-hand end a piston 78 slidable in a cylinder 80 which is secured in the bracket 30. A cover plate 82 carries a rod packing 84 and a hydraulic connection 86. At its right-hand end, the cylinder 80 is closed by an intensifier cylinder 88. Suitable through rods 90 clamp the end plate 82, cylinder 80, and intensifier 88 in position upon the bracket 30. The intensifier cylinder 88 provides a hydraulic connection 92 to the right-hand end of cylinder 80. The connection 92 enters radially through a bushing 94 which receives the ram 96 which slides in the bushing 94 for the purpose of closing the connection 92 and intensifying the hydraulic pressure in cylinder 80. The ram 96 is operated by a large area piston 98 which is slidable in a cylinder 100 having hydraulic connections 102 and 104 at its opposite ends. Suitable air bleed valves, such as indicated at 106, may be provided at the high points of the various fluid chambers.

Figures 9, 10, 11:
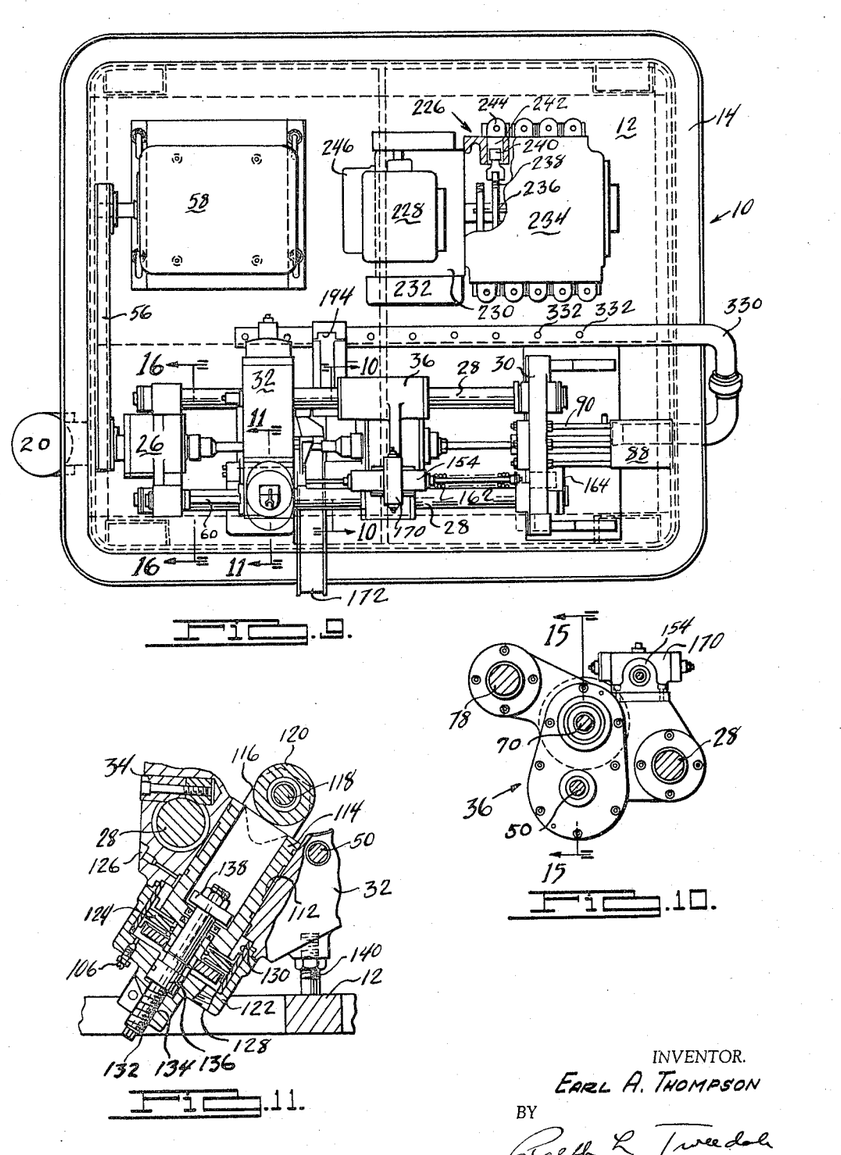
FIGURE 9 is a top view of the machine shown in FIGURE 7.
FIGURE 10 is a fragmentary sectional view on line 10—10 of FIGURE 9.
FIGURE 11 is a fragmentary sectional view taken on line 11—11 of FIGURE 9.

Referring now to FIGURES 11 and 17, the work head 32 comprises a generally triangular base casting 108 which has three cylindrical bosses 110 provided with internal bores 112 for the reception of reciprocating roller support rams 114. The inner end of each ram 114 is formed as a clevis 116 for the reception of a trunnion pin 118 upon which a work forming roller 120 is journaled by suitable anti-friction bearings. Suitable keyways, not shown, prevent relative rotation of rams 114 in their bores 112. Closing the outer end of each bore 112 is a cylinder cup 122 within which slides a piston 124 attached to the roller support ram 114. Hydraulic connections 126 and 128 are provided for each end of the cylinder 130 within which piston 124 slides. The cylinder cup 122 also carries an adjustable stop pin 132 which is threaded therein at 134 and has a cylindrical sealing portion 136. The stop pin 132 projects through the piston 124 and carries a stop collar 138 at its inner end which limits the inner stroke of the ram 114. The frame 108 of the work head 32 may carry an adjustable jackscrew 140 for supporting the weight of the work head 32 independently of the ways 28. The frame casting 108 may also carry a removable abutment plate 142 for positioning a work piece axially of the machine in a preliminary loading station, later to be described.

Referring now to FIGURES 9, 10, and 18, the tailstock 36 carries a mechanism for removing finished work pieces which are indicated in dotted lines at 144 in FIGure 18. Suitable rail bars 146 (FIG. 17) are mounted on the work head 32 for supporting the work piece at the start and finish of the rolling operation. The work removing device comprises a hook bar 148 which is secured to a longitudinally reciprocating arm 150 which also partakes of oscillation through a small arc to engage and disengage the work piece 144, see FIGURE 17. The arm 150 is carried by a rod 152 mounted for both reciprocating and rotary motion in a long bearing boss 154, which is mounted on the tailstock 36, FIGURE 10. The rod 152 has a stop collar 156 which normally abuts the left-hand end of bearing boss 154. At its right-hand end the rod 152 carrier a collar 158 and a hardened abutment button 160. A compression spring 162 normally holds the rod 152 in the position illustrated in FIGURE 18 so that the rod 152, arm 150 and work piece hook 148 may move to the right in FIGURE 18 as a unit until the abutment button 160 strikes the inner end of an abutment cup 164, FIGURE 9, mounted rigidly on the bracket 30.

The rod 152 is splined as indicated at 166 in FIGURE 18 for the purpose of meshing with rack teeth formed on a double acting piston 168. The latter is reciprocable in a cylinder 170, FIGURE 12, which is formed as an integral part of the bearing boss 154. Adjustable stop pins 169 limit the stroke of piston 168, and connections 171 and 173 are provided for the ends of cylinder 170. By this means the rod 152 may be oscillated to swing the arm 150 and hook 148 into and out of engagement with the work piece 144. A delivery chute 172, FIGURE 9, may be provided for carrying finished work pieces to the front of the machine where they may be delivered to a suitable receptacle or conveyer.

For the purpose of automatically feeding work piece blanks into position to be roll formed, the loading mechanism, shown particularly in FIGURES 12, 13, 14, 18, and 19 is provided. This comprises a stationary pedestal 175 secured to the upper surface of plate 12, and upon which is mounted the body 174 of a hydraulic motor for oscillating a loader arm 176. The arm 176 is secured to a shaft 178 which is journaled on anti-friction bearings 180 in the body 174. The arm 176 carries a work piece receiving pocket 182 which is open at both ends. An adjustable stop screw 184 on the pedestal 175 limits the counterclockwise stroke of the loader arm, as viewed in FIGURE 12, to a position where the pocket 182 is in line with the headstock spindle 44. At the other limit of oscillation of arm 176, a stop screw 186 positions the pocket 182 in line with a reciprocating plunger 188. The plunger 188 is in axial alignment with a work piece blank 190 positioned upon a hook-shaped rest 192, FIGURE 14, formed at the bottom of a supply chute 194 which is mounted on the pedestal 175.

For the purpose of actuating the plunger 188, a reciprocating hydraulic motor comprising the cylinder 196 is mounted on a bracket 177 attached to pedestal 175. Slidable in the cylinder 196 is a double acting piston 198, the left-hand rod 200 of which carries the plunger 188. The plunger 188 forms a stop for the leftward movement of piston 198 as shown in FIGURE 18. At its right-hand end the piston 198 has a rod 202 which carries an adjustable stop collar 204 forming a variable limit stop for the left-hand motion of the piston 198. Suitable hydraulic connections 206 and 208 are provided at opposite ends of the cylinder 196.

For oscillating the loader arm 176, the shaft 178 is provided with a pinion 210 which meshes with rack teeth formed upon a pair of single acting pistons 212 and 214. The latter are reciprocable in cylinders 216 and 218, respectively, which are formed in the motor body 174. An end cover 220 has hydraulic connections 222 and 224 for the respective cylinders.

For the purpose of providing motivation to the various movable parts of the machine having the hydraulic motors heretofore described, there is provided a mechanico-hydraulic drive unit 226 which may be in the form of a self-contained unitary assembly mounted upon top plate 12 of the base 10. The drive unit 226 comprises an electric motor 228 which is arranged to drive a self-controlled two-speed transmission contained in a gear box 230 having a change gear enclosure 232.

Attached to the gear box 230 is a multi-section hydraulic pulsator unit 234 having a cam shaft 236 driven by the transmission and carrying a plurality of cams 238, the followers of which operate the transmitter pistons 240 of the respective pulsator sections. Each piston reciprocates in a cylinder 242 having a head 244 which contains a suitable inlet replenishing check valve and a high pressure relief valve, both of which communicate with a low pressure oil reservoir formed in the unit 234. An electrical cam box 246 is located on the opposite side of the transmission 230 and contains a cam driven synchronously with the cam shaft 236.

Figure 22:
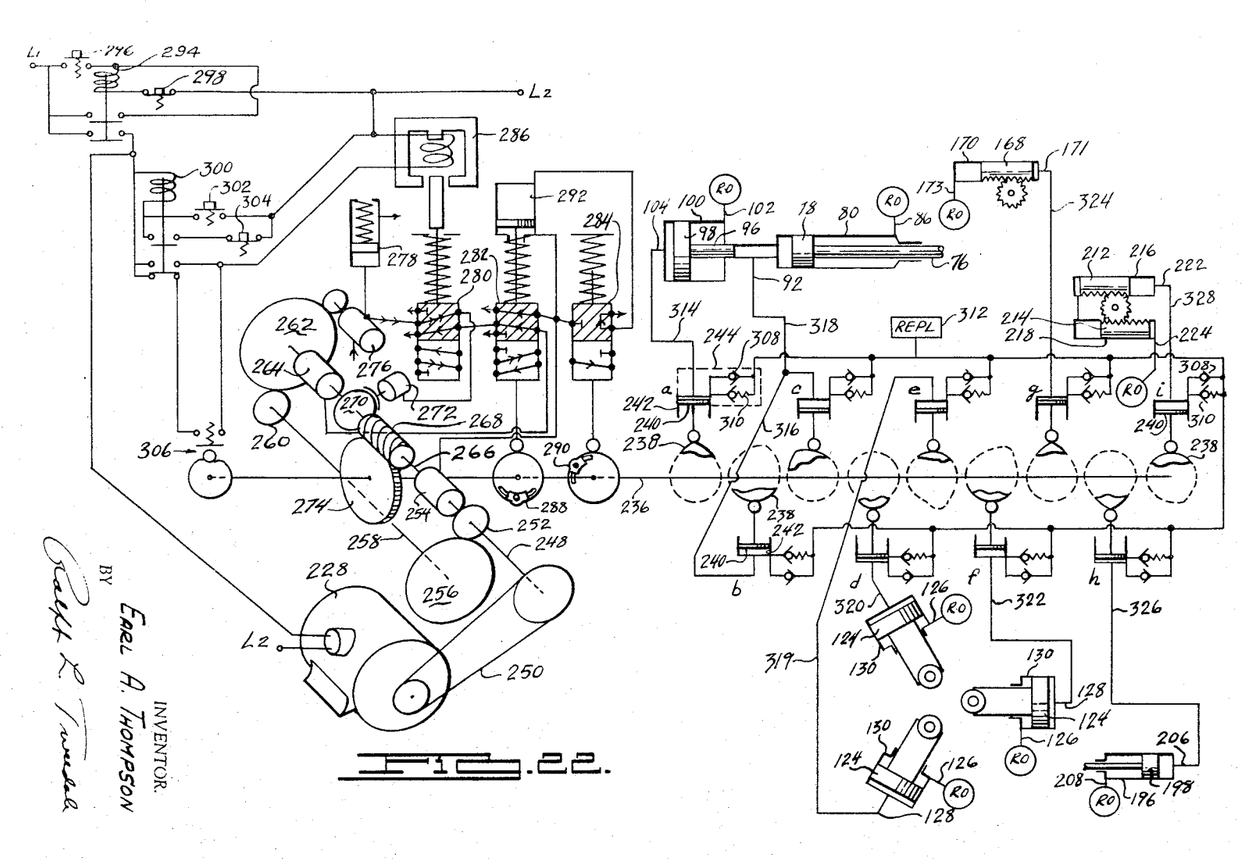
FIGURE 22 is a diagrammatic view of a mechanico-hydraulic motivation system forming part of the machine of FIGURE 7.

The construction of the mechanico-hydraulic drive unit and its associated electric circuits is shown diagrammatically in FIGURE 22. The electric motor 228 drives the input shaft 248 of the two-speed transmission through a belt drive 250. The input shaft 248 drives a pinion 252 and also the input member of a hydraulically engaged, spring released clutch 254. Pinion 252 drives a gear 256 secured to countershaft 258 which carries pinion 260 at its opposite end. Pinion 260 drives gear 262 and therewith constitutes a set of speed change gears located in the enclosure 232. Gear 262 drives the input member of a second hydraulically engaged, spring released clutch 264. The driven members of clutches 254 and 264 are secured to the opposite ends of a shaft 266 having a worm 268 thereon and a brake drum 270. The latter has a spring biased hydraulic motor 272 for engaging the brake. Worm 268 drives a worm wheel 274 secured to the cam shaft 236.

For the purpose of automatically controlling the starting, stopping and speed of the transmission, there is provided a hydraulic control pump 276 driven from gear 262, which may circulate a body of oil contained in the gear box 230 for control and lubricating purposes. The pump 276 may deliver to a combined accumulator and relief valve comprising a spring loaded piston 278 and also supplies oil to a bank of control valves 280, 282, and 284. In the diagrams each valve is shown as a two-position valve, spring biased to the position illustrated in which the connections shown in the cross-hatched rectangles are established. Single headed arrows are used to indicate flow at reservoir pressure and double headed arrows to indicate flow at pump delivery pressure. Each of the valves, when shifted, establishes the connections shown in the unhatched rectangles immediately below the hatched rectangles.

Valve 280 is arranged to be shifted by a solenoid 286. Valves 282 and 284 are arranged to be shifted by the adjustable cams 288 and 290, respectively, which are positioned on cam shaft 236. In addition the valve 282 has a hydraulic holding cylinder 292 which holds the valve 282 in its shifted position until it is released by the shifting of valve 284. Valve 280 in the position shown delivers pressure fluid to engage the brake 272 and exhausts fluid to release the low speed clutch 264. When shifted, valve 280 exhausts fluid to release brake 272 and supplies pressure fluid to engage the low speed clutch 264 subject, however, to a conjoint control by the valve 282.

The latter valve, in the position illustrated, exhausts fluid to release the high speed clutch 254 and places the low speed clutch 264 under the control of valve 280. In its shifted position, valve 282, provided valve 280 has been shifted, delivers pressure fluid to engage high speed clutch 254 and exhausts fluid to release low speed clutch 264. As previously explained, the valve 284 is merely a reset valve for bypassing the holding cylinder 292 to permit valve 282 to return to its spring biased position shown in the drawings.

Thus, energization of solenoid 286 will start the cam shaft rotating at slow speed. Thereafter, the cam 288 will shift the transmission to drive the cam shaft at high speed and still later the cam 290 will again shift the transmission to slow speed. So long as the solenoid 286 remains energized, the cam shaft 236 will continue to rotate, first at a slow speed and then at a high speed during each revolution, controlling its own speed changes by operation of the cams 288 and 290.

For the purpose of controlling the drive motor 228 and the solenoid 286, there is provided an electric control circuit connected between a pair of electric supply lines designated $L_1$ and $L_2$. The circuit may include a master relay 294 of the holding type having a manual master start switch 296 and a manual master stop switch 298. Relay 294 controls the motor 228 and also a cycle control relay 300 of the holding type having a manual cycle start switch 302 and a manual cycle stop switch 304. The normally open contacts of relay 300, which are of the make before break type, control energization of cycle solenoid 286 directly. The normally closed contacts of relay 300 also control solenoid 286, but are in series with a cam switch 306 provided in the cam box 246 and arranged to be opened once during a revolution of the cam shaft 236. The arrangement is such that when the cycle stop switch 304 is operated at any point in the rotation of cam shaft 236, relay 300 will be denergized but solenoid 286 will remain energized until cam switch 306 opens at the predetermined stopping point. Operation of the master stop switch 298, however, will deenergize solenoid 286 immediately regardless of the point in the cycle and will also deenergize motor 228.

The cam shaft 236, as previously mentioned, drives a number of cam operated hydraulic pulsator sections designated $a$ through $i$ inclusive. Each section may comprise a single acting pulsator cylinder 242, the head 244 of which contains a replenishing check valve 308 and a spring closed relief valve 310. All of the replenishing and relief valves are connected to a common oil reservoir 312 which may be formed in the housing of unit 234 and is preferably subjected to a low super-atmospheric pressure by a body of compressed air or other pressure maintaining arrangement. Check valves 308 allow flow from the reservoir 312 to the cylinder 242 while relief valves 310 allow flow oppositely when cylinder pressure exceeds a certain value.

The pulsator section $a$ is connected by a closed liquid column line 314 with the head connection 104 of the intensifier cylinder 100. The pulsator sections $b$ and $c$ are connected in parallel by a jumper line 316 which in turn is connected by a closed liquid column line 318 with the connection 92 for cylinder 80. The sections $d$, $e$, and $f$ are individually connected with one of the connection ports 128 of roller support cylinders 130 by their respective closed liquid column lines 319, 320, and 322. The pulsator section $g$ is connected by a closed liquid column line 324 with the connection 171 of cylinder 170 for the work piece extractor 148. Pulsator section $h$ is connected by a closed liquid column line 326 with the connection 206 of cylinder 196 for the blank pusher. Pulsator section $i$ is connected by a closed liquid column line 328 with the connection 222 for cylinder 216 which operates the loader arm.

Figure 7:
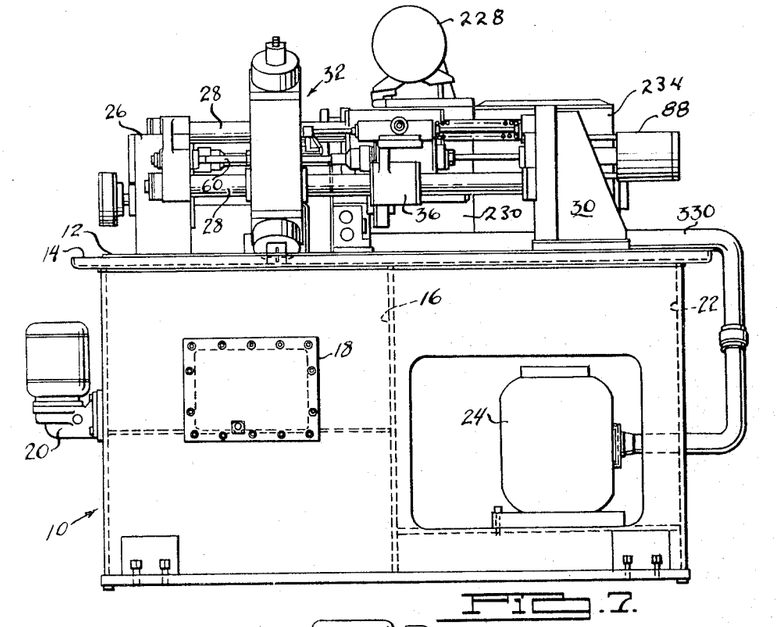
FIGURE 7 is a front view of an automatic rolling machine embodying another form of the present invention.
Figure 8:
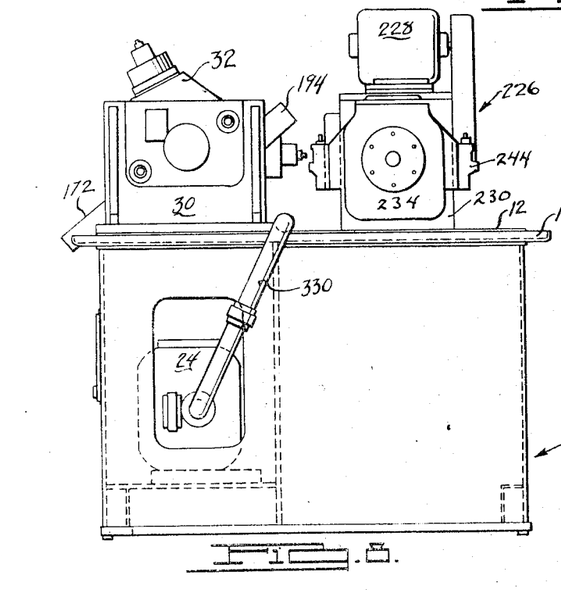
FIGURE 8 is an end view of the machine shown in FIGURE 7.

In FIGURE 22 there are shown several circles marked RO and connected to the ends of the various motive cylinders which are opposite the liquid column connections. These symbols designate the return oil connections by means of which each pulsator circuit is hydraulically biased so as to maintain the follower in close contact with the cam as the falling portion of the cam contour recedes from the follower. This bias is maintained by the high pressure accumulator or oil reservoir 24 which, as shown in FIGURE 7, 8, and 9, is provided with a large diameter manifold pipe 330 which extends across the top of the plate 12 and is provided with a number of outlet taps 332. The plumbing connections by which these taps are connected to the points marked RO in FIGURE 22 have been omitted from the pictorial views of the machine for purposes of clarity and the same is true of the closed liquid column lines for the pulsator sections $a$ through $i$. These connections may be established in accordance with usual plumbing practice. The contours of the individual cams 238 are, likewise, not illustrated in specific detail since they may be formed in accordance with usual practice so as to cause motivation of each of the respective hydraulic motors in accordance with the particular operating cycle of the machine. Likewise, the speed ratio between the high and low speeds of the cam shaft 236 and the duration of the high speed portion of a cycle may be selected as desired through use of the appropriate change gears 260–262 and through adjustment of the cams 288 and 290.

In operation with the reservoirs 24 and 312 filled with oil and with a body of compressed air at respectively high and low pressures, and with a supply of tubular work piece blanks filling the supply chute 194, the master start switch 296 is closed to start motor 228 of the mechanico-hydraulic control unit. With the spindle drive motor 58 started, a cycle may be initiated by operation of the cycle start switch 302. This energizes relay 300 which in turn energizes solenoid 286 to shift the starting valve 280 and cause operation of the cam shaft 236 at its slow speed as previously explained.

Figure 12:
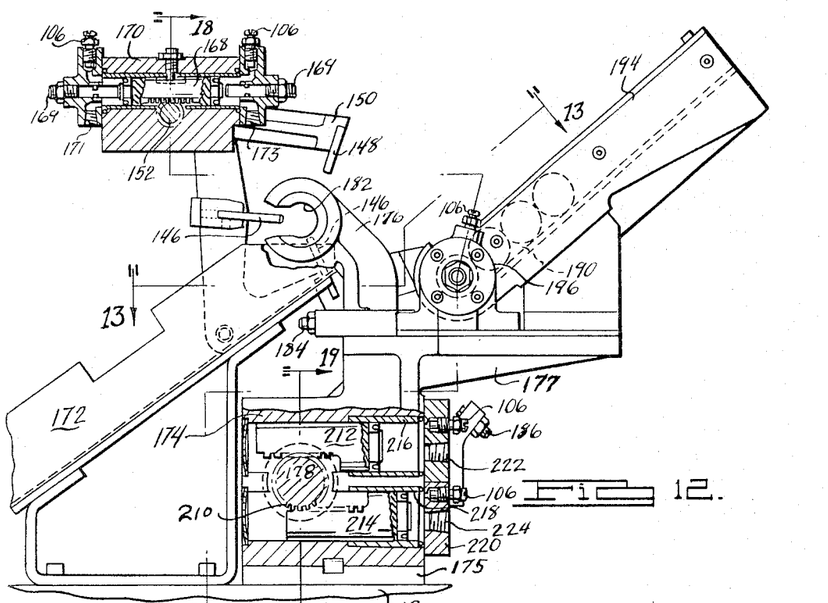
FIGURE 12 is a fragmentary sectional view on line 12—12 of FIGURE 18.
Figures 12, 13:
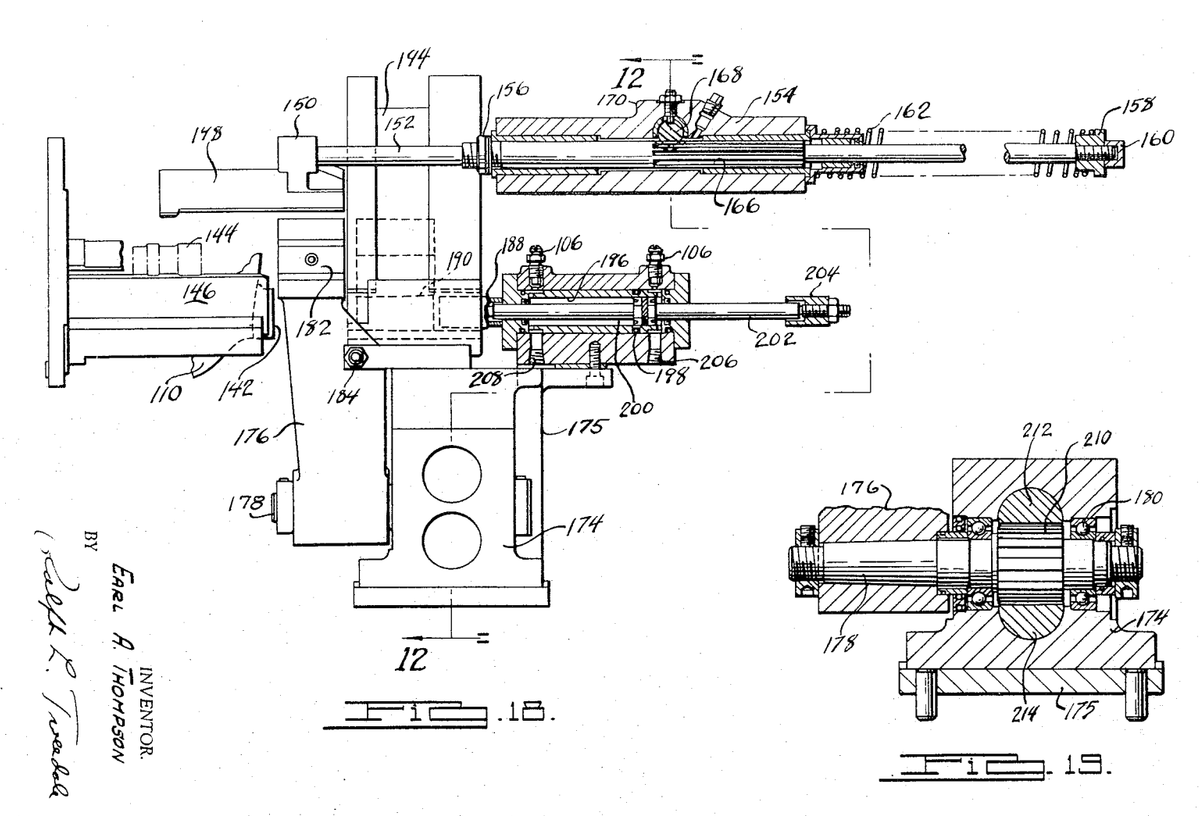
FIGURE 13 is a fragmentary sectional view on line 13—13 of FIGURE 12.
Figures 13, 14:
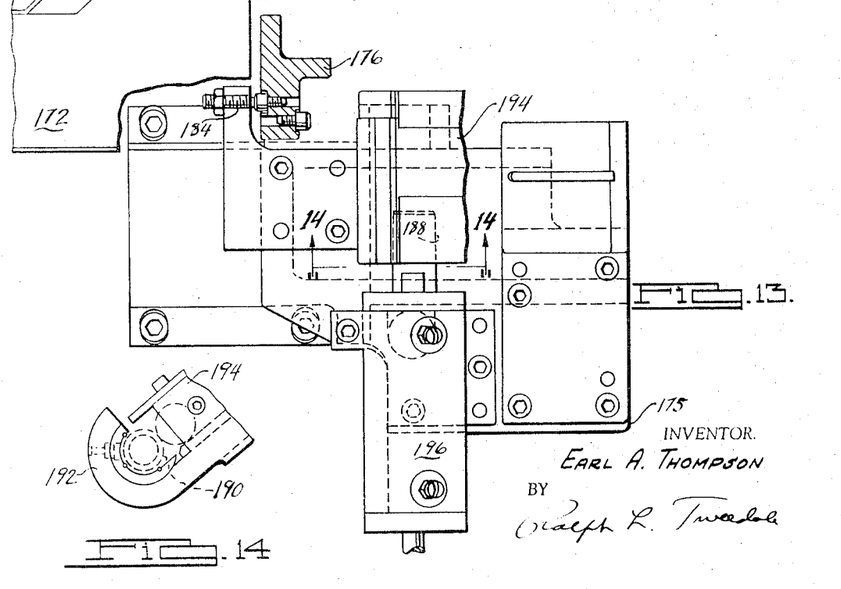
FIGURE 14 is a fragmentary sectional view taken on line 14—14 of FIGURE 13.

A convenient place to start a cycle is with the loader arm 176 raised to the position shown in FIGURE 12 and with the tailstock 36 retracted to the right in FIGURES 7, 9, and 15. With a workpiece blank in position in pocket 182, the b and c section pulsators will add their displacements together to project the piston 78 to the right in FIGURE 22, thus propelling the tailstock to the left in FIGURE 15. The arbor 70 is provided with a small diameter core 334 and with an intermediate diameter shoulder 336, FIGURE 20, which enter in the work piece blank 190 and push it out of the pocket 182 in the loader arm onto the rails 146. The arbor 44 also has a small diameter core 338 for a purpose later to be described.

Figure 20:
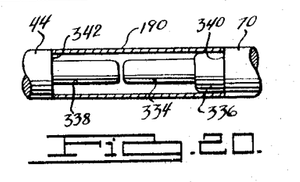
FIGURE 20 is a fragmentary sectional view of a work piece blank in position prior to forming.

As the tailstock reaches the position illustrated in FIGURES 7, 9 and 15, the valve tripping cam 290 shifts the reset valve 284 and then releases it. This has no effect during the initial revolution, however, since high speed valve 282 remained in the position shown in FIGURE 22 upon initial starting of the cam shaft 236. At about this same time the pulsator section a begins to project the intensifier piston 98 and ram 96 closes off the entry port 92 and begins to intensify the pressure in the cylinder 80. This creates a tight clamping effect on the work piece blank 190, as shown in FIGURE 20, wherein the blank is clamped between the shoulders 340 and 342 on the arbors 70 and 44, respectively. This causes the blank to rotate with the arbors which are driven from the motor 58 through the belt 56, quill shaft 50, and the gearing 46–48 and 72–74. At about this same time the pulsator section i begins to retract allowing return oil to propel the piston 214 to the left in FIGURE 22 thus returning the loader arm 176 to its position against top 186 in FIGURE 12, wherein the pocket 182 is in line with the loading plunger 188. This stroke is completed in about the middle of the roll forming operation.

Figure 21:
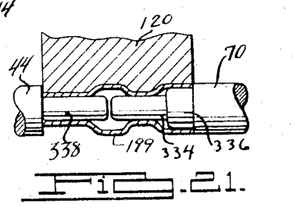
FIGURE 21 is a view corresponding to FIGURE 20 after the forming operation is completed.

Also at this time the pulsator sections d, e, and f begin to propel the roller supports inwardly causing the rollers 120 to form the work piece into the shape shown in cross section in FIGURE 21 as described in more detail hereafter.

When the loader arm reaches its retracted position, the loading plunger is advanced by the pulsator section h which delivers oil to piston 198 propelling it to the left in FIGURES 18 and 22. This pushes a fresh work piece blank into the pocket 182 of the loader arm. During the course of this latter operation, pulsator section g may operate the piston 168 to the left in FIGURE 22, or to the right in FIGURE 12, to swing the arm 150 and the extractor hook 148 down against a finished work piece 144 as the rolling operation is being completed. As these strokes are finished, the cam 288 shifts the high speed valve 282 to disengage the low speed clutch 264 and to engage the high speed clutch 254. The subsequent actions take place at a faster speed.

The pulsator section a accordingly recedes rapidly, allowing return oil to retract the intensifier piston 98. Likewise, the pulsator sections d, e, and f recede allowing return oil to retract the roller support pistons 124. Also at this time the pulsator section h may recede allowing return oil to return the piston 198 for the loading plunger. When this completes its stroke, the stack of work piece blanks in the supply chute 194 drops down to fill the vacant space at the bottom of the stack.

At about the time these strokes are completed, the pulsator sections b and c may recede permitting return oil to return the tailstock 36 by shifting piston 78 to the left in FIGURE 22. During the first motion of tailstock 36, the extractor hook 148 moves with the tailstock and is in engagement with the finished work piece 144. This pulls the work piece off from the core 338 and slides it along the rails 146 until it falls into the delivery chute 172. As the tailstock reaches a point in the middle of its retraction stroke, the motion of the extractor rod 152 is abruptly stopped by abutment of the button 160 at the right end of rod 152 with the bottom of the abutment cup 164, FIGURE 9, and the further motion of tailstock 36 merely compresses the spring 162.

At about the same time the pulsator section g recedes allowing return oil to shift piston 168 to the right in FIGURE 22 and to the left in FIGURE 12, thus swinging the extractor hook 148 upwardly to the position shown in FIGURE 12. As soon as this stroke is completed, the pulsator section i begins to drive piston 212 to the left in FIGURE 22, thus raising the loader arm 176 to the position shown in FIGURE 12 with a fresh work piece blank in the pocket 182 ready for a new cycle to begin.

This new cycle is a repetition of the one previously described except that the advance of the tailstock 36 is rapid, because the cam shaft 236 is still turning at high speed. When valve cam 290 trips valve 284, the high speed valve 282 is restored to the position shown in FIGURE 22 and the subsequent motions take place at slow speed.

It will be understood that the pulsator circuits are maintained in their predetermined phased relationship through the action replenishing valves 308, relief valves 310, and the limit stops which are arranged for each of the hydraulically motivated devices. The volumetric displacement of each transmitting piston 240 throughout the full range of the stroke generated by the rise and fall of its cam 238 is so chosen that there is a small amount of extra displacement beyond that of its corresponding hydraulic motor when the latter moves through the maximum stroke between its limiting abutment stops. Thus, for example, on the pulsator section i the loader arm 146 may be shifted from stop 186 to stop 184 by piston 212 without requiring the full displacement of the transmitter piston 240 for section i. The small excess volume is discharged through relief valve 310 back to the replenishing reservoir 312 while the arm 146 rests against the stop 184. Upon the return stroke of the arm 176, as the transmitter piston recedes, motor piston 212 will return its original volumetric displacement to the transmitter cylinder before the transmitter piston 240 is completely retracted. During the remaining retraction of piston 240, the low super-atmospheric pressure maintained in replenishing reservoir 312 will open the replenishing check valve 308 thus refilling the liquid column 328 to its original volume and holding the piston 240 and its follower tightly in contact with the cam 238. At the same time any volume of oil which may have been lost by leakage is replaced through the replenishing valve 308.

The action of the other pulsator sections is similar to that described, except that in the case of the section a the relief valve 310 opens early in the advancing stroke of the piston 98 as determined by the relief valve pressure setting in comparison with the deflection of the machine parts, compressibility of the oil, and the compressive yield of the work piece endwise under the rolling action. In every case, however, the same amount of liquid which is lost from the pulsator column through the relief valve 310 and through leakage on the advancing stroke is returned to the liquid column during the latter part of the receding stroke through the replenishing valve 308.

In conducting a rolling operation such as that illustrated in FIGURES 20 and 21, the machine may be so set up and adjusted that certain novel and highly desirable results are achieved. For example, in forming a valve tappet component having a groove or cannelure in its mid section and a reduced diameter at one end, such as shown in FIGURE 21, ordinary low carbon steel, welded tubing may be utilized as the work piece blank 190. By arranging the length between shoulders 340 and 342 of the arbors 44 and 70 so that the work piece, when initially contacted, does not permit the cores 334 and 338 to touch, it is insured that the work piece is tightly clamped between the shoulders for positive rotation by friction from the arbors. This initial spacing of the arbor cores may be varied to bring about various effects in the thickness of the annular wall sections which join the reduced and unreduced portions of the finished article, as will be later described.

Figures 23, 24:
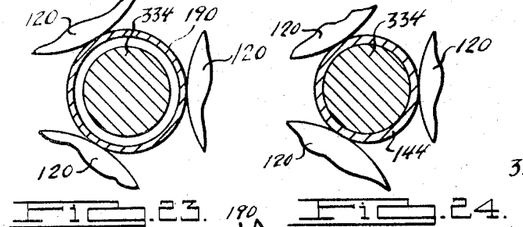
FIGURE 23 is a transverse section showing a work piece blank in position prior to forming.
FIGURE 24 is a view corresponding to FIGURE 23 after the forming is completed.
Figure 26:
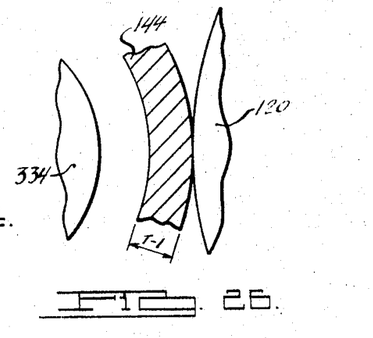
FIGURE 26 is an enlarged view corresponding to a portion of FIGURE 23.
Figure 27:
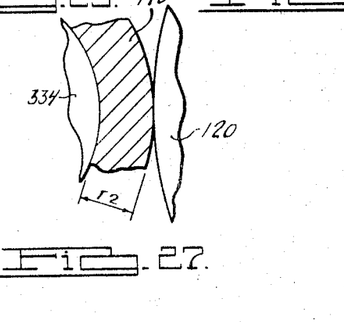
FIGURE 27 is an enlarged view corresponding to a portion of FIGURE 24.

The present method contemplates maintaining a high enough pressure on the ends of the blank to prevent endwise expansion or even to bring about some endwise contraction during the rolling process. In the former case, such as illustrated in FIGURES 20 and 21, the effect of the present rolling method may be seen from a comparison of FIGURES 23 through 28. In FIGURES 23 and 26, the blank 190 is shown in its unreduced form and having its original wall thickness T–1. In reducing the inside and outside diameters to the conditions shown in FIGURES 24 and 27, without permitting any endwise expansion of the piece, there results a thickening of the wall to the value T–2, which is several percent greater than T–1. This is brought about by a circumferential compacting of the metal under the repeated rolling action. In bringing this about, the radial inward progress of the rolls is comparatively slow for each revolution. It has been found from experience that the work piece should be rotated quite a number of revolutions during the progress of the rolls from the FIGURE 23 position to that of FIGURE 24. A work piece of the proportions indicated approximately in the drawings may take about 50 revolutions in a three roll work head to bring it in to the arbor.

Figure 25:
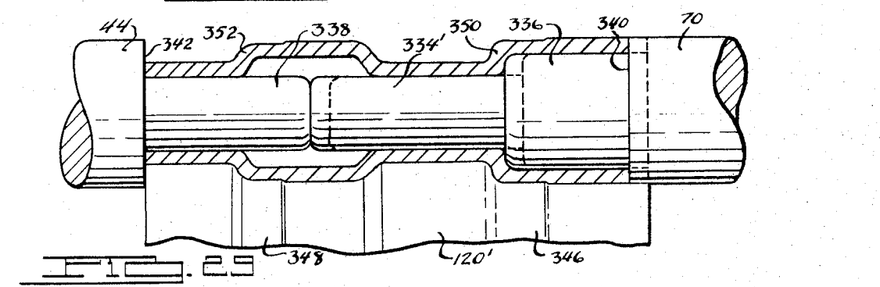
FIGURE 25 is a view corresponding to FIGURE 24 showing in exaggarated form a defective work piece.

The point at which the inward progress of the rolls is stopped is such that the arbor 334 is contacted by the inner wall of the work piece and thereby a precise size, shape, concentricity and finish of the interior is obtained. It is important, however, that the stopping points of the roller supports be accurately set so as to avoid any thinning of the wall by rolling it between the arbor and the work roller. This undesirable action is illustrated in FIGURES 25 and 28. Here it is seen that the pinching action between rollers 120 and arbor core 334, if continued, will thin the wall down to a thickness T–3 and since the piece cannot expand endwise, it will expand in a circumferential direction. This creates a gap between the arbor and the wall as shown at 344 causing the piece to assume a non-circular shape while the rolling action is occurring.

In the annular wall sections which join the reduced sections with the unreduced sections, the thickness will vary gradually from T–1 in the outer portion to T–2 in the inner portion where the method illustrated in FIGURE 21 is performed, that is to say, where the intensifier pressure is maintained at a value which merely prevents endwise expansion of the work piece blank. However, a modified method may also be performed, as illustrated in FIGURE 29, wherein the intensifier pressure is maintained at a higher value so that the arbor 70 is forced toward arbor 44 during the rolling operation. For this purpose the core 334' is shorter than the core 334 and the form rollers 120' may be shaped somewhat differently than the rollers 120. Thus, the rollers 120' have a slightly raised shoulder 346 which overlies the end of the shoulder section 336 and a similarly slightly raised portion 348 further to the left. These serve to squeeze the metal from the unreduced wall sections into the annular wall sections at 350 and 352, respectively, so that as the rolls make their approach to their final positions, these shoulders 346 and 348 come in contact with the unreduced portions and simultaneously the arbor 70 advances to the left under the higher accumulator pressure. This shortens the over-all length of the blank and results in relatively straight radial shoulders on the inner walls of the annular sections 350 and 352, providing additional stock for subsequent machine operations, if desired.

It will thus be seen that the present invention provides an improved rolling apparatus which automatically receives blank tubular work pieces and without further manual handling converts them into formed components of a desired shape in an economical and efficient manner.

The invention also provides an improved method for forming tubular pieces with walls of different diameters and thickness along their lengths resulting in an improved product.

While the form of embodiment of the invention as herein disclosed constitutes a preferred form, it is to be understood that other forms might be adopted, all coming within the scope of the claims which follow.

I claim:

1. A machine for forming a predetermined configuration on the inner surface of a generally tubular walled work piece which initially has an unfinished internal surface dimensionally greater than said predetermined configuration comprising a rotatable finishing arbor of a configuration corresponding to said predetermined configuration, spindle means for rotatably supporting the work piece in concentric telescoped relation about the arbor, means forming a plurality of transversely shiftable roller supports, a form roller journalled on each support for conjoint rotation with the work piece, a plurality of individual hydraulic motors, one for each of the supports, connected to shift the supports to and fro, a plurality of rotary cam powered and controlled liquid column type motion transfer devices, one for each of the hydraulic motors, connected to operate the hydraulic motors, and common camshaft means for driving the transfer devices in unison to synchronously shift the roller supports transversely to roll the work piece wall progressively inwardly between the plurality of form rollers and to terminate the transverse shifting just after the internal surface of the work piece wall makes complete peripheral contact with the arbor but before any noticeable thinning of the work piece wall takes place.

2. A machine for forming a cannelure in a tubular workpiece comprising a headstock having a rotary head spindle and a tailstock having a rotary tail spindle, power means for driving at least one of the spindles, means for placing and removing workpieces between said spindles, a hydraulic motor for operating said placing and removing means, a shouldered arbor carried by one spindle and having a core section smaller than the bore of the workpiece, a hydraulic motor for shifting one spindle axially relative to the other to clamp a workpiece between the spindles, means forming a plurality of roller supports, at least one of which is radially shiftable, a form roller journalled on a shiftable support, a hydraulic motor for shifting the roller support to force the roller into the workpiece, and a mechanico-hydraulic motivator of the rotary cam and liquid column type connected to the hydraulic motors for actuating them in timed relation to roll the wall of the workpiece inwardly while holding the ends clamped against endwise expansion.

3. A tube contracting machine comprising a frame having a set of ways thereon, a fixed headstock secured to the frame, a movable tailstock member slidable toward and away therefrom on the ways, coaxial spindles rotatably mounted in fixed axial relation to each stock, means for driving both spindles in synchronism, a plurality of roller supports mounted on movable members for movement transversely toward and away from the spindles, a movable work ejector member comprising a bar slidable longitudinally with respect to the tailstock and having a workpiece engaging movable member swingable into and out of engaging relation, means yieldably holding the bar in fixed relation to the tailstock, an abutment on the machine for stopping the ejector in the mid stroke of the tailstock to eject a workpiece from the tailstock spindle, and a combined cycle programming and actuating system connected to actuate the movable members in timed relation.

References Cited by the Examiner
UNITED STATES PATENTS

| | | | |
|---|---|---|---|
| 2,062,415 | 12/1936 | Harrison | 72—82 |
| 2,106,495 | 1/1938 | Debor | 72—69 X |

FOREIGN PATENTS 121,912 7/1946 Australia.

CHARLES W. LANHAM, *Primary Examiner.*

RICHARD J. HERBST, *Examiner.*

C. H. HITTSON, H. D. HOINKES,
*Assistant Examiners.*

UNITED STATES PATENT OFFICE
CERTIFICATE OF CORRECTION

Patent No. 3,299,680

January 24, 1967

Earl A. Thompson

It is certified that error appears in the above identified patent and that said Letters Patent are hereby corrected as shown below:

Column 1, line 67, "surface" should read -- surfaces --. Column 2, line 4, "they" should read -- the --. Column 3, line 69, "through" should read -- upon --; line 74, cancel "39". Column 6, line 5, "carrier" should read -- carries --. Column 10, line 43, after "action" insert -- of the --.

Signed and sealed this 24th day of March 1970.

SEAL)

Attest:

Edward M. Fletcher, Jr.

Attesting Officer

WILLIAM E. SCHUYLER, JR.

Commissioner of Patents